Patented Aug. 16, 1932

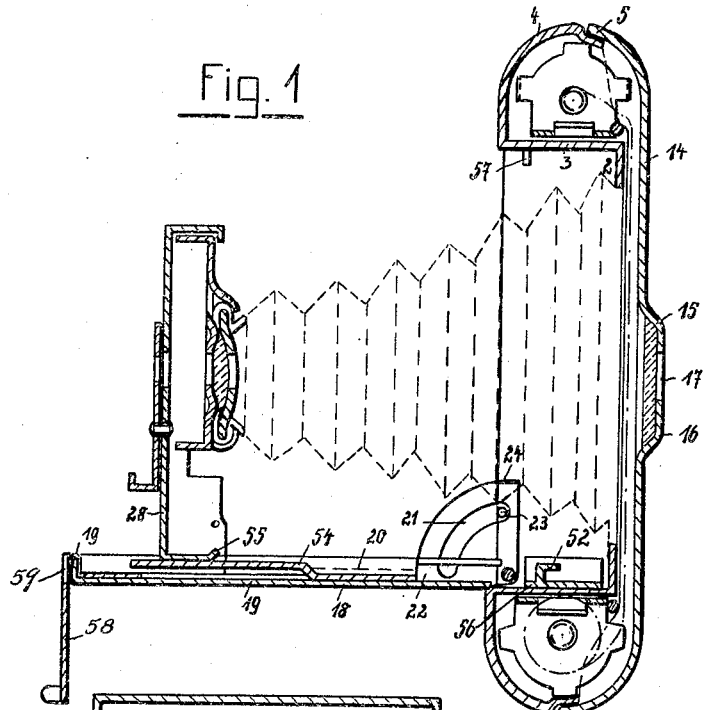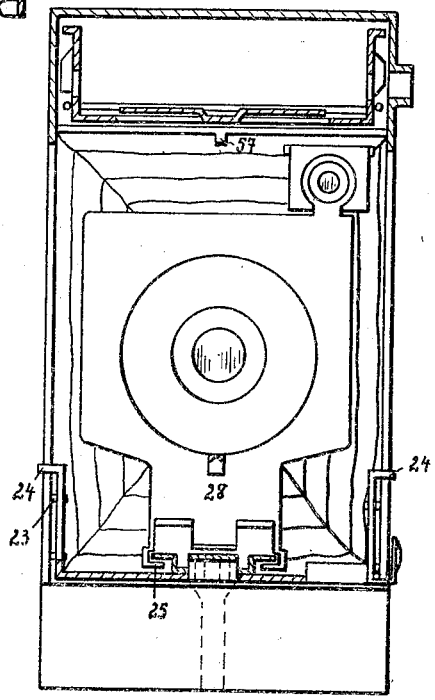

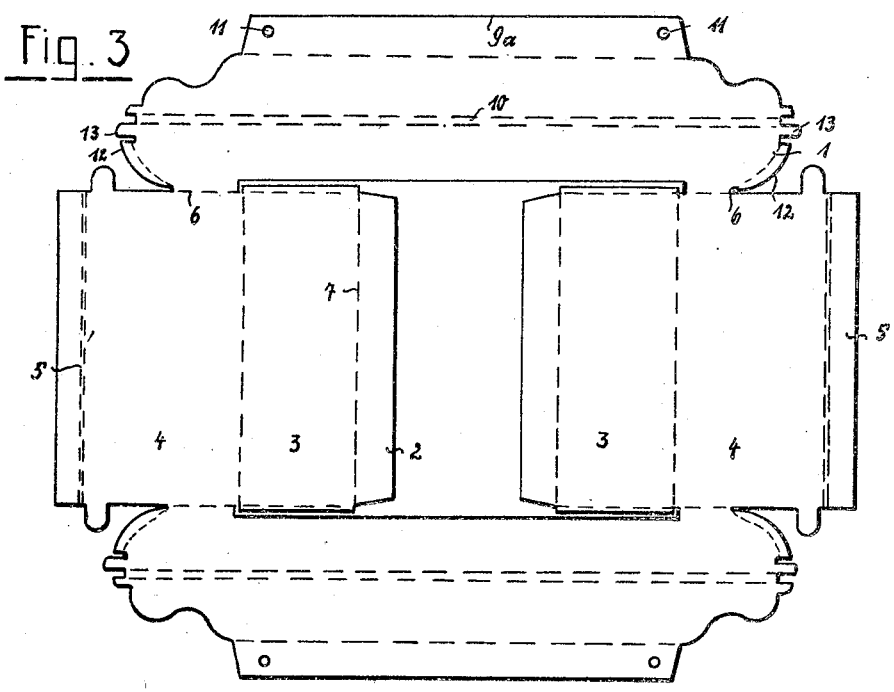
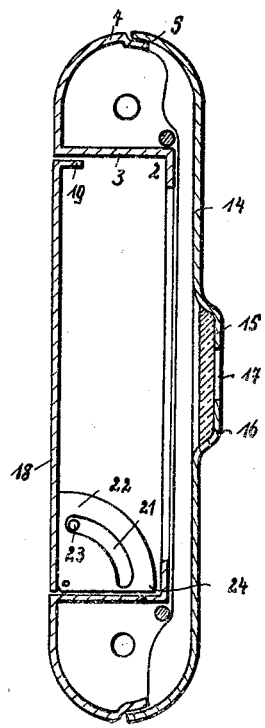

1,871,717

UNITED STATES PATENT OFFICE

BRUNO MAYER, OF NUREMBERG, GERMANY

PHOTOGRAPHIC CAMERA

Application filed February 28, 1929, Serial No. 343,444, and in Germany March 5, 1928.

My invention relates to a photographic camera and has for its purpose to simplify and cheapen, to a large extent, the manufacturing process, so as to obtain, in spite of low manufacturing costs, an apparatus which meets all requirements.

This object is obtained through the fact that not only the casing but also its cover as well as the folding guiding bottom, are made each out of one undivided body of sheet metal.

In accompanying drawings my invention is shown by way of example:—

Fig. 1 is a longitudinal section

Fig. 2 is a front view partly in section

Fig. 3 is a longitudinal section of the casing in closed position without any accessories Fig. 4 is a developed illustration of the entire blank of the fundamental body of the casing.

According to Figs. 1-4 the casing of the photographic camera consists of an undivided body of sheet metal which has—in developed state—two lateral parts 1, as shown by Fig. 3, and is made in one piece with the intermediate sections 2, 3, 4 and 5 in such a way that the lateral parts are in connection with the intermediate sections, in conformity with the edges 6. The casing is formed out of this fundamental body in such a manner that at first the ledges 2 are turned downwards around the edge 7 in a right angle, whereupon two slightly curved strips 8 are placed at the two longitudinal sides of section 3 (both at the left and at the right hand side) in a upright direction and that then the sections 3 are bent upwards in a right angle. The lateral walls 1 are thereupon placed upwards in a right angle to the intermediate section, after their dividing surfaces 9 have been reduced in accordance with the continuous edge 10 about half a millimeter, so that the longitudinal ledges 9a—likewise bent formerly in a right angle— will abut against the cross ledges 2 and register with each other at the depressions or projections 11 respectively, at which the casing is jointed together by soldering, welding, riveting or the like. Before bending up, the end sections 4 have been lapped over in form of a quadrant, after having reduced the longitudinal strips 5 (Fig. 1) so that the end sections 4 abut against the inwardly turned ledges 12 of the longitudinal walls and can be connected firmly with them by turning up the laps 13. The casing—decreased to some extent in its exterior width by reducing the parts 9 and 5—enables to easily put on the rear cover 14 which is formed out of an undivided body of sheet metal and provided in its center line with a depression 16 having an aperture 15 for receiving a red disk 17 of celluloid, glass or the like, so that through this aperture the number of the covering paper of the film may be ascertained and the latter adjusted exactly.

On the lateral walls 1 is suitably attached by means of hollow rivets the guiding bottom 18 stamped likewise out of an undivided body of sheet metal, which bottom is provided at its longitudinal edges and at its front edge with upwardly bent borders 19 and 20 and passes over, at its rear end, in a guiding member 22 provided with a bow-shaped slot 21 exerting a resilient action towards the outside, whereby a cross pin 23 of the casing engages with the said slot. The bow-shaped guide carries a cam 24 rising gradually backwards which secures the guiding bottom, when the latter is opened, and enables to close the same only by exerting a lateral pressure onto the bow-shaped guide. In the longitudinal axis of the guiding bottom which may still be provided—for the purpose of its stiffening—with a groove, is fixed the sliding bar 26 having upwardly bent borders 25 whereby the borders of the sliding bar engage with downwardly bent ledges 27 of the objective lens holder 28.

In the sliding bar 26 of the guiding bottom 18 is stamped out a resilient tongue 54 projecting freely with its front end and being bent somewhat upwardly. Against this tongue 54 abuts a sliding member 55 of the objective lens holder 28 projecting downwardly and turned backwardly, in such a manner that between both parts a sufficient friction is ensured, in order to hold the objective lens holder in the position for which it has been adjusted. To secure the latter on the stirrup or on the bar 52, even after having been pushed into the casing, the yoke of the said bar 52 is provided with a stamped out tongue 56 which projects into the path of the sliding member 55 of the objective lens holder and adjusts the latter by a certain clamping action. A hinged lever 58 is mounted onto the front end of the border 19 of the guiding bottom, said lever being foldable and serving as support, if the photographic camera is to be brought in position for use. In the closed position of the guiding bottom, a mouth 59, arranged in that lever 58, engages with a pin 57 of the casing, acting thereby as locking device.

What I claim is:

A photographic camera, comprising in combination a casing formed in one piece of sheet metal, two lateral walls being bent upwardly at right angles and reduced rearwardly, intermediate sections joined to the lateral walls, cross ledges arranged on said intermediate sections and adapted to be bent downwardly at right angles, two slightly curved strips placed at the longitudinal sides of said section and adapted to be bent upwardly at right angles, longitudinal ledges adapted to abut against said cross ledges, end sections lapped over in form of a quadrant, inwardly turned ledges arranged on the lateral walls, laps adapted to connect the said ledges, a rear cover formed out of an undivided body of sheet metal and adapted to put on the rearwardly reduced parts of said lateral walls, said cover being provided in the center with a depression having an aperture therein, a red disk fixed in said aperture.

In testimony whereof I affix my signature.

BRUNO MAYER.